April 18, 1967     A. MINELLA     3,314,085
CONCEALED POP-UP VALVE FOR WASTE DRAINS
Filed Oct. 5, 1964     3 Sheets-Sheet 1
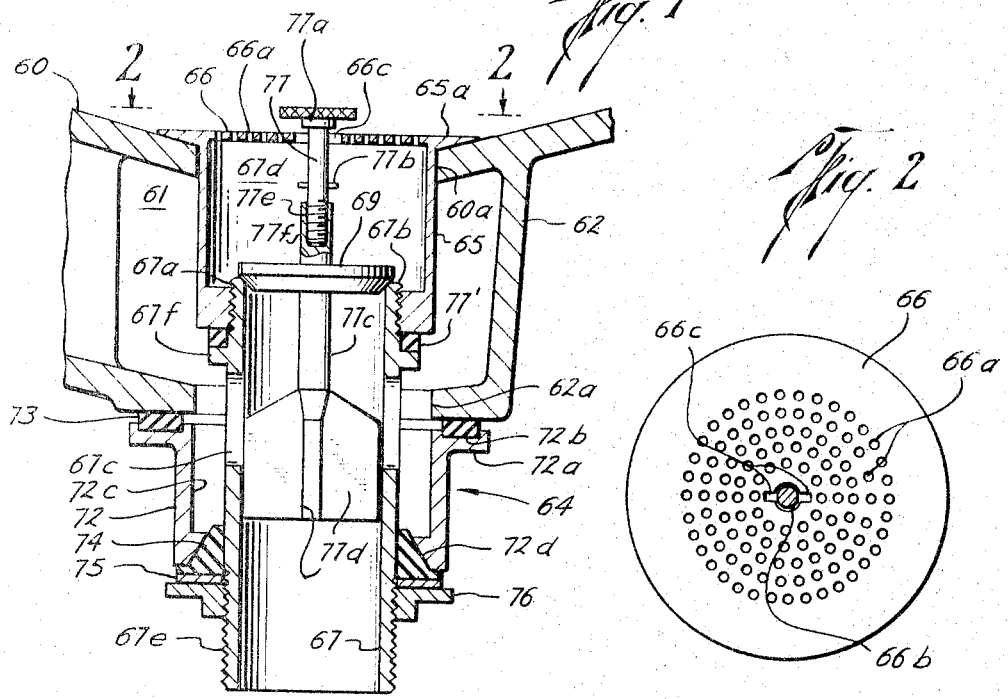
Fig. 1
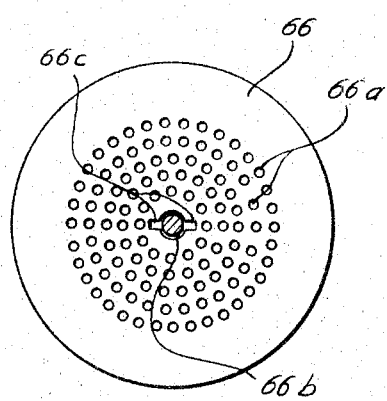
Fig. 2
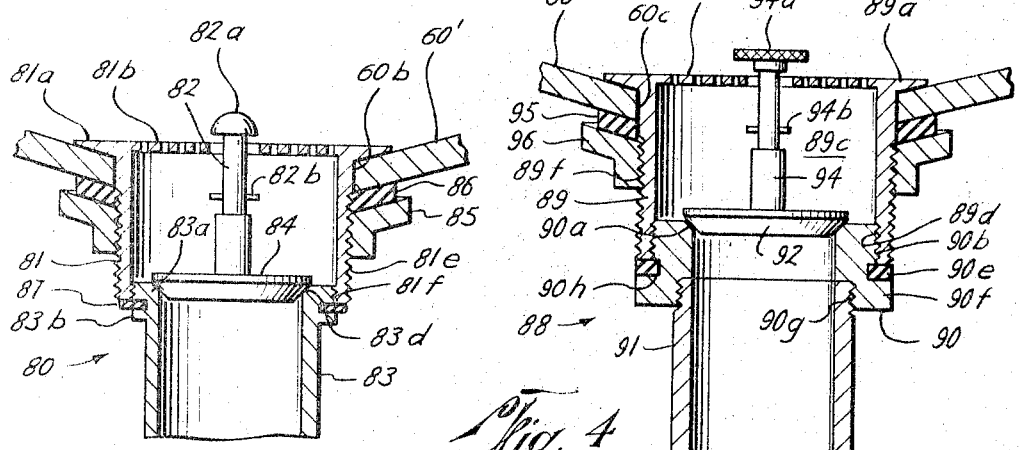
Fig. 3     Fig. 4
Angelo Minella
INVENTOR.
BY 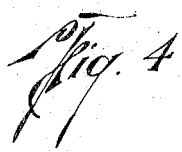
ATTORNEYS

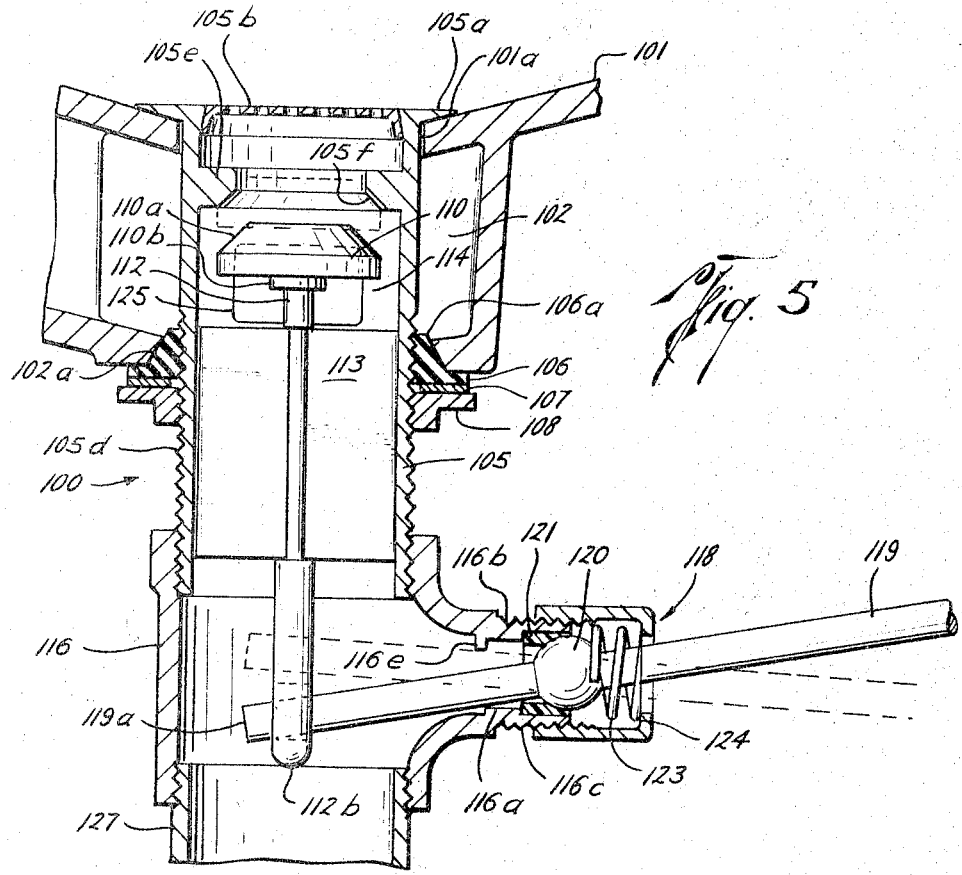
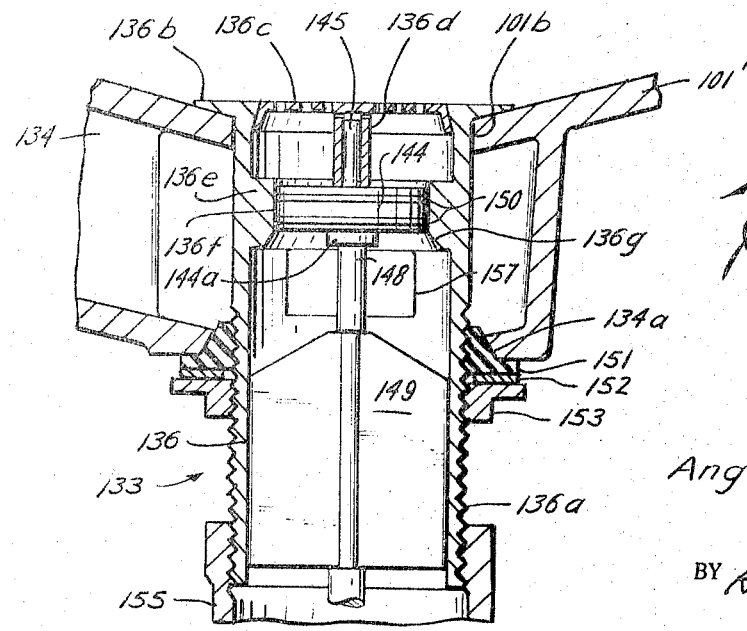

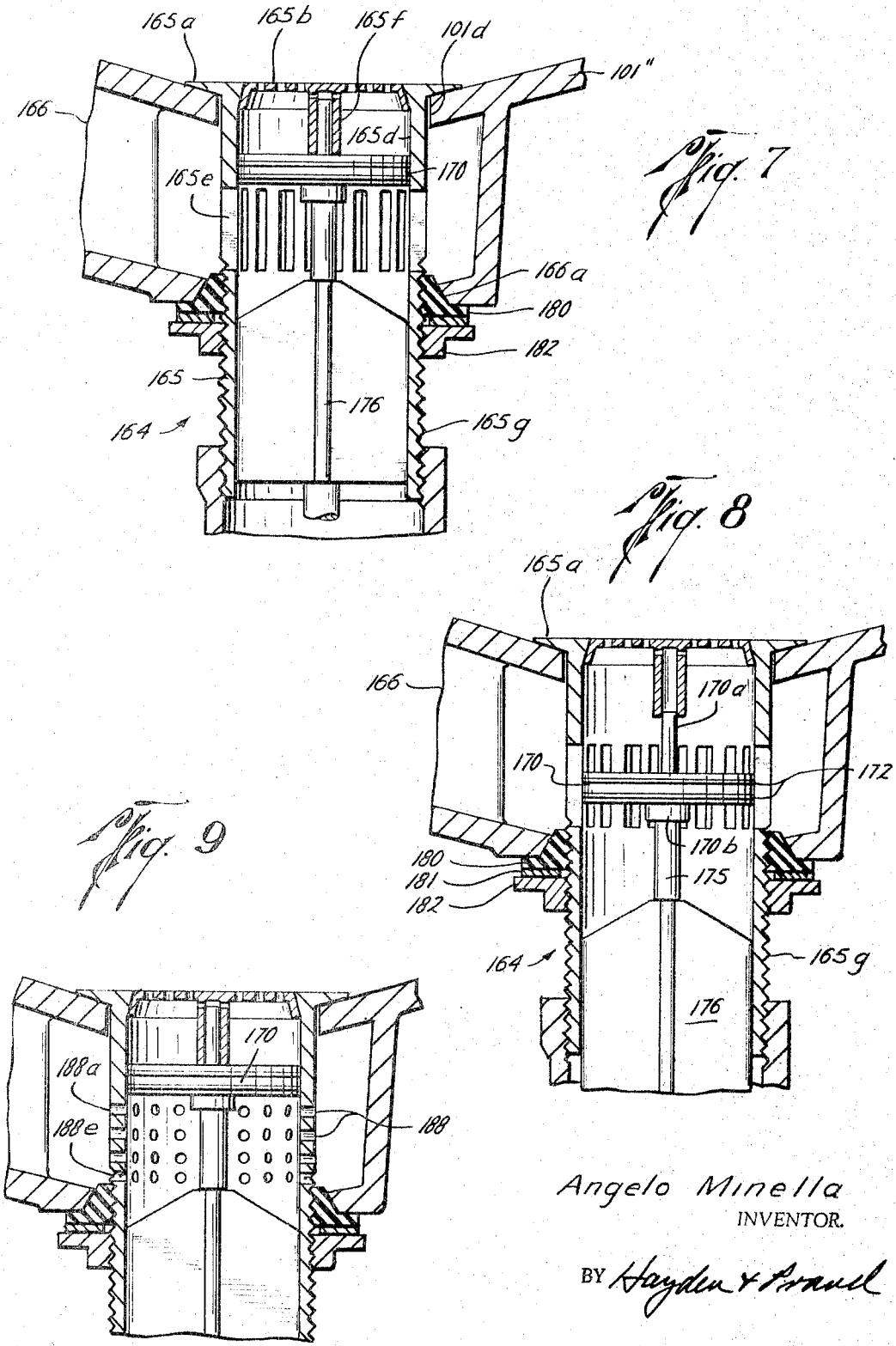

United States Patent Office 3,314,085
Patented Apr. 18, 1967

3,314,085
CONCEALED POP-UP VALVE FOR WASTE DRAINS
Angelo Minella, Houston, Tex., assignor to A. Minella Plumbing Supplies, Inc., a corporation of Texas
Filed Oct. 5, 1964, Ser. No. 401,518
3 Claims. (Cl. 4—287)

This invention relates to concealed pop-up waste valves suited for installation in lavatories and other receptacles having waste openings for fluid drainage therefrom with the fluid flow controlled by the valve. The pop-up waste valve is housed in a tamper proof structure including strainer means for preventing hair, lint, buttons, tube caps and small articles of value from passing through the valve to the waste line. In addition, protection from many hazards accures from placing the valve components in a tamper proof structure positioned below the drain opening of a lavatory or receptacle.

The loss of valve members ranging from rubber plugs suspended on chains to the movable elements of valve assemblies known in the prior art is commonplace and annoying for the owners of lavatories, basins and other liquid containers installed for public convenience, whether done maliciously or resulting from the occurrence of unfortuitous events.

The drainage of liquids from receptacles such as lavatories installed with public or limited access removes any solid materials in the liquid through the drain which is communicated with a sewerage system by means of various valve mechanisms associated with the receptacle. As may not infrequently occur, items of value are lost in sink drains and bathroom lavatories and such valuable items are occasionally recovered, if at all, by physically dismantling the trap usually positioned therebelow in the drainage system. The various embodiments of this invention illustrate a new and improved waste drain assembly including a concealed pop-up valve which is adapted for use in sinks, basins, bathtubs and other receptacles for screening and holding solid matter in the liquid. It may be appreciated that such screening protects valuable articles such as jewelry and tableware from loss.

An object of this invention is to provide a new and improved drain assembly including a concealed pop-up drain valve.

One object of this invention is to provide a new and improved drain valve constructed in a tamper proof body.

Another object of this invention is to provide a new and improved drain valve assembly including a concealed pop-up drain valve mounted on a push rod which extends through trash screening means.

Still another object of this invention is to provide a new and improved waste drain assembly including a foraminated cover adapted to prevent the passage of solid matter and lint through the assembly.

An object of this invention is to provide a new and improved drain valve assembly in which the valve is located between a foraminated cover or strainer and the overflow outlet that communicates with the waste outlet.

A further object of this invention is to provide a new and improved waste valve assembly in which the apparatus is concealed beneath a strainer or screen.

Another object of this invention is to conceal a valve beneath a strainer in a drain outlet of a receptacle and above the overflow outlet of the receptacle so that if the valve is seated to close off the drain in the receptacle, it does not interfere with the discharge of overflow from the receptacle through the overflow outlet to the waste drain.

Yet another object of this invention is to provide a new and improved concealed pop-up waste valve which may be opened and closed by releasable securing means.

An additional object of this invention is to provide a new and improved waste drain assembly which is actuated by means extending upwardly through the waste drain opening.

A further object of the invention is to provide a concealed pop-up valve for receptacles wherein the valve mechanism is concealed.

Other objects and advantages of the present invention will become readily apparent from a consideration of the following description and drawings wherein:

FIG. 1 is a sectional view of one embodiment of the present invention installed in the waste opening of a lavatory or the like having an overflow interconnected with the assembly;

FIG. 2 is a view taken along the line 2—2 of FIG. 1 which illustrates one form of a foraminated cover used for screening solid material from liquid passing therethrough;

FIG. 3 is a sectional view of another embodiment of this invention installed in the waste drain opening of a lavatory having no overflow means;

FIG. 4 is a sectional view of an additional embodiment of this invention illustrating one construction of the concealed pop-up valve assembly adapted for installation in a liquid receptacle having no overflow means;

FIG. 5 is a sectional view of an additional embodiment of the concealed pop-up waste valve of this invention having lever operated, valve actuating means;

FIG. 6 is a sectional view of a waste valve having an encompassing valve seat with valve actuating means deleted from the view;

FIG. 7 is a sectional view of an additional embodiment of this invention with valve actuating means deleted from the view;

FIG. 8 is a view similar to FIG. 7 illustrating the waste valve in the open position for draining waste fluids from the receptacle; and FIG. 9 is a view of the embodiment shown in FIG. 7 illustrating side opening means which are holes.

In FIG. 1, the lower portion of a sink 60 or other similar receptacle is illustrated as having a centrally located drain opening 60a for draining waste liquid from the receptacle 60 to tubular member 67 that connects with a waste trap (not shown) in a manner well known in the art. The lavatories or similar receptacles 60 include an overflow opening (not shown) located to drain liquid from the container and thereby prevent overflow of the container. The overflow opening is communicated by means of a conduit or duct 61 generally formed by the wall 62 appended to the lower side of the lavatory or receptacle 60 which conduit 61 also includes a centrally located and axially aligned opening 62a beneath the drain opening 60a of the lavatory.

The concealed pop-up waste valve assembly illustrated generally at 64 illustrated in FIG. 1 is to be mounted relative to the opening 60a and 62a of the lavatory as shown in FIG. 1. The assembly 64 is shown as including a hollow cylindrical member 65 having an outwardly extending annular flange 65a encircling one end thereof. The flange 65a is adapted to contact the surface of the receptacle 60 adjacent drain opening 60a and is contoured to seal against the receptacle and prevent the leakage of liquid between the opening 60a and the member 65. The upper end of the cylindrical body 65 is closed by trash screening means 66 illustrated in the view of FIG. 2 which has the preferred form of a foraminated disc with openings 66a provided for liquid drainage. Centrally of the foraminated cover 66 is located a generally circular opening 66b having a pair of projecting, oppositely disposed slots 66c whose function will be made more apparent hereinafter.

The cylindrical body 65 is extended by a tubular member 67 which is engaged therewith by suitable means such as threads 67a which member provides an inwardly facing chamfered surface or seat 67b having a contour adapted to sealingly seat a valve 69 thereagainst. The member 67 includes side opening means 67c positioned below the valve seat 67b for conducting fluid from overflow passage 61, through opening 62a and into member 67. The lower portion of the member 67 is threaded at 67e for connection to the waste trap and with a sewerage drainage system in a manner well known in the art.

The member 67 does not seal against the radius of the overflow opening 62a but fits loosely therein to thereby engage a lavatory conduit 61 of any size. An adapter 72 is positioned around the member 67 and has an upright flange 72a having a small groove 72b therein for receiving a seal ring 73 and securing same against the nether side of the overflow conduit 61. The adapter 72 has an internal bore 72c which is larger than the diameter of member 67 so that overflow liquids may easily flow from 61 through opening 62a and into opening 67c in member 67. A tapered washer 74 and a friction ring 75 are forced against the lower, tapered opening 72d of the adapter 72 and are maintained in sealing relationship therewith by a rotatable lock nut 76 which is adapted to be threaded on the threads 67e formed on the exterior lower portion of the member 67.

The member 67 is provided with an annularly extending shoulder 67f immediately below the threads 67a and contacts a seal ring 77' against the lower face of the member 65 as shown in FIG. 1 to form a seal between 65 and 67.

The body 65 and member 67 cooperate to define a valve chamber 67d for receiving valve 69 therein. The valve 69 is carried on a valve rod 77 extending upwardly through the centrally located opening 66b of the foraminated cover 66 which valve rod has an enlargement 77a on its exposed end for manipulation of valve 69. The valve rod 77 also includes a locking pin 77b which is spaced above the valve 69 to enable the valve 69 to be retained in open position by moving the locking pin 77b upwardly through slots 66c and then rotating valve rod 77 to rest the locking pin 77b on disc 66. The valve rod 77 may be engaged to valve 69 in any suitable manner such as threads 77e on rod 77 engaging a socket 77f formed in valve member 69 as shown in FIG. 1. The portion 77c of valve rod 77 which extends beneath valve member 69 carries suitable valve guide means such as the perpendicularly extending, circumferentially spaced guide vanes 77d. It may be appreciated that while four guide vanes 77d are implied by FIG. 1 for aligning the valve 69 relative to the seat 67b, other guide means may be utilized to achieve the guidance necessary to bring the valve and valve seat into sealing relationship with one another.

In operation, the drainage valve assembly of this invention is installed in the illustrated relationship in the drain opening of a lavatory or other similar receptacle.

The drain assembly illustrated in FIG. 1 is installed with the annular flange 65a conforming with and seating against the surface of the lavatory 60 whereupon the adapter 72 and seal ring 73 is placed against the lower surface of the overflow conduit 61 and sealed in position by means of the tapered washer 74, friction ring 75 and lock nut 76. The sealing contact of the adapter 72 against the seal ring 73 and the tapered washer 74 placed between the adapter 72 and the tubular member 67 provides leakproof means whereby liquid may overflow the lavatory 60 into the conduit 61, the passage 62a and the side inlet 67c without mishap.

Conventional drain of liquid from receptacle 60 through the body 65 and tubular member 67 and then to the waste trap (not shown) is controlled by manipulating the enlargement 77a and lifting the valve rod 77 relative to the foraminated cover 66 to move the lock pin 77b through the slots 66c in the cover 66. When the lock pin 77b has moved through the slots 66c, the valve rod 77 may be rotated in either direction to cross position of lock pin 77b relative to the slots 66c in the cover and thereby retain valve 69 in elevated position relative to valve seat 67b. The waste fluid from receptacle 60 may then drain through foraminated cover 66 and into the valve chamber 67d, and since the valve 69 is lifted clear of the valve seat 67b to permit unrestricted flow into the tubular member 67 and the sewerage system. The foraminated cover 66 collects small articles including lint, hair, bottle or tube caps, and even items of value on the upper surface of the cover within easy access for cleaning or retrieval. The cover 66 may be concave or convex although it is shown as a planar device in the drawings.

It may be appreciated that the lock pin and cover opening cooperate as means for releasably securing the valve in the open position in the valve chamber 67d in spaced relation with the valve seat 67b to permit the flow of waste liquids therethrough. Vertical movements of the valve 69 are guided by the guide vanes 77d projecting outwardly from the valve rod as said vanes are moved interiorly of the member 67. Waste liquids are translated through the hollow cylindrical body and carried away by the sewerage system connected thereto.

Should it be desired to close off the drain opening of receptacle 60 the enlargement 77a is rotated to align the lock pin 77b with the slots 66c adjacent opening 66b whereupon the valve rod and the valve 69 carried thereon are dropped to the illustrated position of FIG. 1 with the valve 69 seated against the chamfered surface 67b. The lavatory 60 is sealed to prevent the further flow of liquid through the waste opening in accordance with the desires of those using such lavatory except the liquid should overflow through the conduit 61. On occurrence of overflow, the liquid flows through the overflow conduit 61 and such liquid is conducted by the conduit 61 into the inner bore of the adapter 72 and through the side opening means 67c. Such overflow is then disposed of by the sewerage disposal system without regard to whether the valve 69 is open or closed.

FIG. 3 illustrates an additional embodiment of the present invention wherein a portion 60' of a lavatory having no overflow means is illustrated as providing a waste opening 60b. The waste valve assembly 80 is shown positioned in the waste opening 60b and more particularly, a cylindrical member 81 is positioned therein by an annular flange 81a at one end of the member 81. The upper end of the hollow cylindrical body 81 is closed by a foraminated closure member 81b and a valve rod 82 extends therethrough and carries a knob or enlargement 82a thereabove. The member 81 aligns a centrally located valve seat 83d and a valve member 84 is carried on the valve rod 82 within the cylindrical body 81 and adjacent the valve seat. A lock pin 82b is mounted on the valve rod 82 and it may be appreciated that the restraint of motion of the valve rod 82 provided by the foraminated cover 81b and the sidewalls of the hollow cylindrical member 81 guide the valve 84 relative to the valve seat 83d for sealing contact therewith when actuated. The hollow cylindrical body 81 is threaded at 81e for receiving a lock nut 85 thereabout which is threadedly pressed against a seal ring 86 which contacts the lower surface of the lavatory 60'.

The cylindrical member 81 includes threads at 81f for engaging a tubular member 83 having a threaded, outwardly extending shoulder 83a. The shoulder 83a is spaced from an additional shoulder 83b which aids in defining an annular groove therebetween for receiving a washer 87 which is pressed against the end face of the cylindrical member 81. The tubular member 83 is threaded into the cylindrical member 81 and the washer 87 aids in sealing the threaded joint against leakage.

The embodiment 80 illustrated in FIG. 3 is installed in a lavatory or other waste receptacle by positioning the flange 81a against the surface of the bowl, and clamping means including the lock nut 85 are adjustably connected to the hollow cylindrical body 81 by rotation about the threads 81e to achieve a watertight seal upon rotation to a locking position. The tubular member 83 is connected to the hollow member 81 to provide the valve seat 83d for the valve 84 carried on the valve rod 82. The waste valve assembly 80 illustrated in FIG. 3 is operated in the manner similar to that of the embodiment 64 illustrated in FIG. 1 by manipulation of the valve rod which serves as means for moving the valve relative to the valve seat to thereby control the flow of liquid through the cylindrical member 81 and tubular member 83 to the waste line.

An additional embodiment 88 is illustrated in FIG. 4 wherein a lavatory 60″ is illustrated as having a waste opening 60c for receiving the valve 88 therein. The valve 88 includes a hollow cylindrical body 89 having an annular shoulder 89a encircling a foraminated cover member 89b which defines a valve chamber 89c terminating at an annular valve seat 90a. An adaptor 90 having a set of threads 90b engages with thread means 89d for positioning a washer 90e in sealing contact against the lower end of the hollow member 89. The washer 90e is received in an angular groove 90h formed in the adaptor 90 immediately adjacent an annular enlargement 90f for carrying an inwardly facing set of threads 90g. The threads 90g mate with coacting threads carried on the tubular member 91 and it may be appreciated that the adaptor 90 secures the hollow member 89 and tubular member 91 in a leakproof connection.

A seal ring 95 and lock nut 96 is placed in an encircling relationship about the hollow member 89 and is pressed against the nether side of the lavatory 60″ on engagement of the lock nut 96 with the threads 89f carried on the outer surface of the hollow cylindrical body 89. The lock nut arrangement prevents leakage of water or other wastes beneath the annular shoulder 89a by tightening the shoulder against the conforming lavatory or other receptacle so that waste liquids are not permitted to escape along the side of the pop-up waste valve 88 of this invention. The valve chamber 89c defines a sufficient volume for manipulation of a valve 92 which valve 92 is carried on a valve rod 94 at one end thereof with the opposite end having an enlargement 94a positioned above the foraminated cover member 89b. A lock pin 94b is positioned on the valve rod and is adapted to be displaced through an opening in the foraminated cover similar to the opening illustrated in FIG. 2 for locking purposes. The valve chamber 89c and the constraint on the valve rod 94 guides the valve member 92 relative to the valve seat 90a formed on the adaptor 90 on release of the valve 92 from a position suspended above the valve seat 90a by the lock pin 94b which is locked above the foraminated cover 89b.

Sealing contact of the concealed pop-up valve assembly 88 illustrated in FIG. 4 is obtained by placing the seal ring 95 about the hollow cylindrical member 89 and the lock nut 96 is tightened in the well known manner to seal the pop-up valve assembly 88 of this invention in the lavatory 60″. The valve 88 is used in this same manner as previously described embodiments of this invention which operation results from the manipulation of the enlargement 94a to open or close valve 92 relative to the valve seat 90a with the motion of the valve 92 in the chamber 89c being constrained by the hollow cylindrical body 89 and the valve rod 94 extending through foraminated cover 89b. It may be appreciated that the flow of liquid through the valve 88 of this invention is unimpeded and the waste fluids disposed through the valve 88 flow through the foraminated cover 89b, the hollow cylindrical member 89 and into the tubular member 91 with the valve 92 positioned well above the valve seat 90a.

Attention is directed to the embodiment 100 shown in FIG. 5 where a receptacle 101 having an overflow conduit 102 is engaged with the pop-up waste valve 100 of this invention. The receptacle 101 includes an opening 101a which is shown as receiving a hollow cylindrical body 105 having an annular flange 105a encircling the upper end of the body and contacting the upper surface of the receptacle 101 about the opening 101a. A foraminated cover 105b extends across the opening of the upper end of the hollow cylindrical body 105 preferably on a plane with the flange 105a for screening the solid matter in the waste liquid released through the pop-up waste valve 100 of this invention.

The overflow conduit 102 includes an opening 102a defined by an angular shoulder which opening is vertically registered with the opening 101a in the receptacle 101 for receiving the waste valve 100 of this invention. A tapered washer 106 having a conforming shoulder 106a is seated against the opening 102a and is wedged against the outer surface of the hollow cylindrical body 105 to provide seal means limiting the escape of liquids from the waste valve 100. A friction ring 107 is pressed against the lower face of the tapered washer 106 by a lock nut 108 which is threadedly engaged with a set of threads 105d on the outer side of the body.

The hollow cylindrical body includes an inwardly extending annular shoulder 105e which positions a downwardly facing and centered valve seat 105f within the hollow member 105 which valve seat conforms to a chamfered surface 110a formed on a valve 110. The valve 110 includes a collar 110b which receives and engages the upper end of a valve rod 112 which is centered within the hollow cylindrical body 105 by a plurality of valve guide vanes 113. Each of the plurality of vanes 113 extends perpendicularly outwardly from the valve rod 112 and engages the interior wall of the hollow cylindrical body 105 and thereby aligns the valve 110 with the valve seat 105f. The inwardly extending shoulder 105e defines a valve chamber 114 within the hollow cylindrical member 105 for receiving the valve 110 when the valve 110 is unseated from the shoulder 105e, thereby unsealing the valve 100 of this invention to the flow of waste fluids therethrough. The valve chamber 114 is sufficiently large for receiving the valve 110 as shown in full line in FIG. 5 without restricting the flow of waste fluids through the valve 100 of this invention and it may be appreciated that the shoulder 110a on the valve streamlines the valve relative to the fluid flow for reducing the turbulence and increasing the volume of fluid flowing through the valve.

A fitting 116 is engaged with the threads 105d carried on the hollow cylindrical body 105 and positions a lateral opening 116a for receiving valve actuating means indicated generally at 118. The valve actuating means 118 is in the preferred form of a lever 119 extending inwardly of the hollow cylindrical body 105 and positioned immediately therebelow with one end 119a engaged with the lower end 112b of the valve rod 112. The lever 119 includes an integrally formed ball 120 engaged with a socket 121 which is inserted into an upstanding skirt 116b formed on the fitting 116. The ball 120 is maintained in the engaged position illustrated in FIG. 5 by a coil spring 123 which is clamped by a locking member 124 engaged with threads 116c formed on the portion 116b for bringing the spring 123 against the ball 120. The lever 119 extends through the springs 123 and the enlargement represented by the ball 120 engages the spring and is urged against the socket 121 by the force of the spring. It may be appreciated that the lever 119 does not center axially of the spring but is shown in the full line position of FIG. 5 as extending angularly therethrough. The dotted line position of FIG. 5 results from operation of the lever 119 which operation is limited by a stoptab 116e formed within the opening 116a so that the level end 119a of the lever is limited in rotation about socket 120, and the valve rod 112 is also limited in vertical movement upwardly in the hollow cylindrical body 105.

Vertical movement of the valve rod 112 carries the valve member 110 to the dotted line position shown in contact with the valve seat 105f for sealing the pop-up waste valve 100 of this invention. Side opening means indicated generally at 125 communicate the interior of the hollow cylindrical body 105 with the overflow conduit 102 and waste liquids from the overflow drain 102 are drained into the hollow body 105, the fitting 116 and a drain pipe 127 which is amenable to connection to a sewerage disposal system.

In operation, the pop-up waste valve 100 of this invention is installed in a lavatory, receptacle or other waste basin by fitting the annular flange 105a against the conforming surface of the receptacle 101 and tightening the lock nut 108 against the friction ring 107 and tapered seal 106. The tapered seal 106 is pressed against the wall of the hollow cylindrical member 105 and also against the face of the angular shoulder formed on the overflow conduit 102 to operate as leakproof means preventing escape of waste fluids from the valve 100. The valve rod 112 is conected to the lever 119 in any suitable manner and the lever 119 is connected to appropriate actuating means for the waste valve 100 of this invention. Such actuating means may include a hand operated lever or movable control position near the top or upper surface of the lavatory 101 and may also include foot pedals and knee operated mechanical linkages such as is found in hospitals or any other appropriate apparatus.

The valve actuating means 118, shown in full line in FIG. 5, positions the valve 110 below the valve seat 105f to permit the passage of waste fluid through the valve 100 of this invention. The level 119 is reciprocated or otherwise moved to the dotted line position shown in FIG. 5 upon rotation about the ball 120 in the socket 121 and thereby moves the end 119a in the hollow cylindrical body 105 and lifts the valve 110 toward the valve seat 105f. As described in reference to the embodiments illustrated in FIGS. 1 through 4, the valve member seals with the valve seat to prevent the flow of waste liquid through the valve below the forminated cover 105b in accordance with the function of the previously described embodiments.

On occurrence of overflow from the receptacle 101, the overflow liquid is drained through the overflow conduit 102 to the outer cylindrical member 105 where the side opening means 125 communicates the interior of the hollow cylindrical body 105 with the overflow conduit. The overflow of liquid is drained into the hollow cylindrical body 105 and thence to the sewerage system connected to the conductor 127 and is drained without interference with the function of the valve 110 or the valve actuating means 118. It may be appreciated that the side opening means functions to drain the overflow liquid with the valve 110 in the open position or in the closed position relative to the seat 105f which is shown in dotted lines in FIG. 5.

Attention is directed to FIG. 6 which illustrates an embodiment of this invention utilizing an alternative valve and valve seat. More particularly, FIG. 6 illustrates an embodiment 133 which is adapted to be installed in receptacle 101' having a drain opening 101b for evacuating waste liquids from the receptacle 101'. An overflow conduit 134 is placed beneath the bowl of the receptacle 101' and conducts overflow liquid to the waste valve 133 of this embodiment.

The embodiment 133 includes a hollow cylindrical body 136 which extends through an opening 134a in the overflow conduit 134 which is registered below the opening 101b in the receptacle 101'. The hollow cylindrical body includes an encircling annular flange 136b and the upper end of the hollow cylindrical body is closed by a forminated cover 136c which preferably extends across the body at the annular flange 136b. The foraminated cover serves as a strainer for removing solid material from waste liquid passing through valve 133 and is shown as being prefarbly planar although it may be concave or convex if desired. The cover 136c carries a centrally mounted and axially extending tubular sleeve 136d which extends downwardly of valve 133 and has an open bore for receiving a guide rod therein. The relationship of the guide rod and the sleeve 136d will be explained in more detail hereinafter.

The hollow cylindrical body 136 includes an inwardly extending shoulder 136e positioned below the foraminated cover 136c which shoulder terminates in a constricted annular bore 136f which serves as a valve seat for the valve member 144. The shoulder has a valve guide surface 136g facing downwardly of the hollow cylindrical body 136 which is adapted to guide or funnel the valve 144 into the illustrated position adjacent the constricted bore 136f.

The valve 144 carries a guide rod 145 which is centrally located of the valve 144 and extends upwardly therefrom in axial alignment with the hollow sleeve 136d extending downwardly of the hollow body. The valve 144 further includes a mounting collar 144a which engages a valve rod 148 which valve rod mounts a plurality of perpendicularly extending valve guides 149 which extend outwardly of the valve rod 148 and contact the interior wall of the hollow cylindrical body 136. The valve 144 is further equipped with rubber O-rings 150 and the preferred embodiment includes two such rubber O-rings which are received in annular grooves extending about the valve 144 which provide the seats for the O-rings. The O-rings contact the bore 136f of the valve seat and thereby provide a seal preventing the flow of waste liquids through the valve 133.

The pop-up waste valve 133 as illustrated in FIG. 6 is sealed against the escape of overflowing liquid by positioning a tapered washer 151 about the hollow cylindrical body and adjacent the sloping bore of the opening 134a with sealing accomplished by placing a friction ring 152 and a lock nut 153 about the hollow cylindrical body. The lock nut 153 is tightened against the friction ring and the tapered washer is urged into the opening to seal against the overflow conduit housing and the hollow cylindrical body. It may be appreciated that the threads 136a advance the lock nut 153 along the cylindrical body to thereby clamp the tapered washer in place.

The threads 136a on the outer surface of the hollow cylindrical body 136 are further utilized to join the hollow cylindrical body to a fitting 155 which is similar to fitting 116 shown in FIG. 5. The embodiment 133 further includes side opening means 157 communicating the overflow conduit 134 with the interior of the cylindrical body for the escape of overflow liquid. Such overflow liquid is received into the hollow cylindrical body below the valve 144 so that the overflow of liquid does not interfere with the operation of the valve relative to the seat and the sealing of the valve structure 133 thereby maintains liquid integrity of the receptacle 101'. The overflow liquid is communicated downwardly through the hollow cylindrical body, the fitting 155 and is drained to an appropriate sewerage system or other outlet for receiving such waste liquids.

Reference is made to FIG. 5 which illustrates valve actuating means 118 and the fitting 116 and which includes the lever 119 operating through the ball and socket joint to manipulate the valve rod extending upwardly of the hollow cylindrical body. The embodiment illustrated in FIG. 6 preferably utilizes the valve actuating means of FIG. 5 and it is believed unnecessary to further illustrate such means.

In operation, sealing of the waste valve 133 illustrated in FIG. 6 is accomplished by positioning the valve member 144 adjacent the shoulder 136e where the seal rings 150 contact the bore 136f of the shoulder and prevent fluid communications through the valve. Motion of the valve 144 is guided by the valve guide 145 which inserts into the tubular sleeve 136d and is limited by the length of the valve guide rod and the tubular sleeve with the valve guide rod being of appropriate length to stop the valve member 144 centrally of the valve bore 136f with both O-rings 150 contacted against the valve bore.

Valve actuating means are used to move the valve rod 148 downwardly of the hollow cylindrical body 136 to clear the valve 144 of the bore 136f and open the passage through the hollow cylindrical body to liquid flow from receptacle 101'. Liquid in receptacle 101' is drained through the foraminated cover 136c which removes the solid matter from the liquid for easy retrieval within the basin. On occurrence of overflow, such overflow liquid is conducted by the overflow conduit 134 to the side opening means 157 and downwardly through the hollow cylindrical body 136 and to the sewerage system. Such overflow is drained regardless of whether the valve member 144 is positioned in the seat or below the seat in the open position.

FIGS. 7 and 8 illustrate the closed and opened positions respectively of an additional embodiment of this invention while FIG. 9 shows altered side opening means for the valve. A valve 164 is indicated generally in FIG. 7 as including an encircling annular flange 165a extending about a foraminated cover 165b which strains or removes solid material from the liquid drained by the embodiment 164. The valve is mounted in a lavatory or other receptacle 101" which includes a waste drain opening 101d. The receptacle 101" includes an overflow conduit 166 having a tapered opening 166a in which the waste valve 164 is centered.

The hollow cylindrical body includes a smooth inner bore 165d which is interrupted by a predetermined number of spaced, vertically extending slots 165e which serve as side opening means communicating the overflow conduit 166 with the interior of the hollow cylindrical member 165. The foraminated cover includes a downwardly extending tubular member 165f which is open at the bottom and adapted to receive a valve guide rod 170a which is mounted on the valve 170. The valve 170 includes a pair of encircling grooves which contain resilient O-rings 172 for sealing against the bore 165d. The valve 170 further includes a collar 170b. The valve collar 170b receives a valve rod 175 which extends through the hollow cylindrical body 165 for connection to valve actuating means. Such means may be exemplified by the valve actuating means illustrated in FIG. 5 in the fitting 116 and including a lever 119 connected to a ball and socket joint. The valve rod 175 provides a mounting for vanes 176 which guide the rod and align the valve 170 in the hollow cylindrical body for reciprocation.

A tapered washer 180, a friction ring 181, and a lock nut 182 are positioned about the hollow cylindrical body and the lock nut 182 is engaged with threads 165g for movement longitudinally of the hollow cylindrical body to a position clamping the tapered washer against the overflow conduit 166. It may be appreciated that the tightening of the lock nut 182 pulls the annular flange 165a into conforming and sealing contact with the rim of the receptacle 101" immediately adjacent to the opening 101d in the receptacle.

In operation, the embodiment illustrated in FIGS. 7 and 8 is held in the closed position by moving the valve member 170 to the position of FIG. 7 which position is above the vertically extending slot 165e in the hollow cylindrical body. The location of the valve 170 shown in FIG. 7 closes fluid communication through the valve and liquid is held in the receptacle 101". On occurrence of overflow, such overflow is conducted by the overflow conduit 156 through the side opening slots 165e into the hollow cylindrical body and downwardly through the valve 164 to the sewerage system.

Attention is directed to FIG. 8 where the valve 170 is spanned by the side opening slots 165e. Fluid drainage from receptacle 101" is accomplished by conducting waste liquid into the hollow cylindrical body to the valve 170 and outwardly through the upper portions of the vertical slots 165e into the overflow conduit 166. Such fluid is drained by gravity to the lower ends of the drain slots 165e which are below the valve 170 and which communicate the overflow conduit 166 with the interior of the hollow cylindrical member 165. Thus, the overflow liquid is evacuated from the receptacle 101" by detouring around the valve member 170 by way of the vertical slots 165e. It may be appreciated that the waste valve 164 of this invention is able to drain overflow liquid from the overflow conduit 166 with the valve in either position illustrated in FIGS. 7 and 8.

Alignment of the valve 170 is achieved by the members 176 which project from the valve rod 175 and contact the bore 165d and is further aided by the guide rod 170a attached to the valve and engaged with the downwardly opening sleeve 165f. The relative lengths of the tubular member 165f and the guide rod 170a limit the upward motion of the valve 170 to the illustrated position of FIG. 7 where the rubber O-rings 172 engage the interior bore 165d above the slots and seal the valve against drainage of liquids.

The embodiment in FIG. 9 utilizes a plurality of spaced, regularly located holes 188 in lieu of the vertically extending drain slots 165e shown in FIG. 7. On movement of the valve 170 of FIG. 9 to the intermediate position represented in FIG. 8, drainage of liquid through the valve is accomplished by conducting liquid through the bore of the hollow cylindrical body to one of the upper holes identified at 188a which conducts the liquid into the overflow conduit and through the opening 188e which returns the liquid to the interior of the hollow cylindrical body. In all other respects, the embodiment of FIG. 9 is similar to FIG. 8 with the exception of the side opening means as described hereinabove.

It will be noted that in all forms of the invention, the valve is below a strainer and engages a valve seat above the overflow outlet to the waste so as to not interfere with normal flow through the overflow to the drain.

Broadly, this invention relates to a concealed drain valve assembly placed in a tamper proof structure where drainage of liquids through the valve is not restricted and the valve is below a foraminated cover which screens trash and small articles of value from the liquid to avoid the loss of valuables through the drain.

What is claimed is:

1. A concealed pop-up waste valve for receptacles having an overflow drain comprising:
    (a) a hollow cylindrical member;
    (b) an annular flange adjacent one end of said member for seating said cylindrical member in a receptacle waste opening;
    (c) a foraminated cover extending across one end of said member adjacent said flange;
    (d) a tubular member of smaller diameter than said cylindrical member;
    (e) each of said members having thread means whereby said smaller diameter member may be threadedly engaged with the lower end of said larger diameter threaded member to facilitate positioning of said cylindrical member within the receptacle waste opening to inhibit distortion and misalignment thereof;
    (f) said larger diameter member having a radial shoulder extending about the upper end of said smaller diameter member;
    (g) an upwardly facing valve seat formed on said tubular member within said hollow cylindrical member;

(h) a valve within said hollow cylindrical member for seating on said upwardly facing valve seat to close off flow from the receptacle waste opening;

(i) means for lifting said valve off said seat to open the receptacle waste opening;

(j) a valve rod depending from said valve;

(k) said valve rod having integrally formed thereon guides for contacting said tubular member at circumferentially spaced points to center said valve during opening and closing thereof; and (l) said tubular member having at least one opening therein below said valve seat for communicating with the overflow drain of the receptacle.

2. The invention of claim 1 wherein said means for lifting said valve off said seat includes a valve rod threadedly secured to said valve and extending upwardly through an opening in said foraminated cover, said upwardly extending valve rod having an enlargement on its exposed end and a locking pin spaced above said valve, said cover having slots therein extending from the opening so that when said enlargement is manually grasped and said valve rod lifted, said locking pin may move through said slots and said enlargement and valve rod then rotated relative to said slots to hold said valve in open position.

3. The invention of claim 1 including seal means between said cylindrical member and said tubular member to form a seal therebetween.

References Cited by the Examiner
FOREIGN PATENTS

| | | |
|---|---|---|
| 441,358 | 1/1936 | England. |
| 62,652 | 8/1924 | Sweden. |

LAVERNE D. GEIGER, *Primary Examiner.*

B. E. KILE, *Assistant Examiner.*